US011505308B2

(12) United States Patent
Bobis et al.

(10) Patent No.: US 11,505,308 B2
(45) Date of Patent: Nov. 22, 2022

(54) SYSTEM AND METHOD FOR IMPROVING A STALL MARGIN OF AN AIRCRAFT

(71) Applicant: BOMBARDIER INC., Dorval (CA)

(72) Inventors: Otto Bobis, Laval (CA); Clinton Eric Tanner, Senneville (CA); Scott Black, Laval (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/768,160

(22) PCT Filed: Nov. 26, 2018

(86) PCT No.: PCT/CA2018/051495
§ 371 (c)(1),
(2) Date: May 29, 2020

(87) PCT Pub. No.: WO2019/104421
PCT Pub. Date: Jun. 6, 2019

(65) Prior Publication Data
US 2020/0369372 A1 Nov. 26, 2020

Related U.S. Application Data

(60) Provisional application No. 62/592,695, filed on Nov. 30, 2017.

(51) Int. Cl.
*B64C 13/16* (2006.01)
*B64C 3/38* (2006.01)
(52) U.S. Cl.
CPC .............. *B64C 13/16* (2013.01); *B64C 3/38* (2013.01)

(58) Field of Classification Search
CPC ..... B64C 13/16; B64C 3/38; B64C 2003/445; B64C 3/50
See application file for complete search history.

(56) References Cited

U.S. PATENT DOCUMENTS 3,134,562 A   5/1964  Hovgard
3,822,047 A   7/1974  Schuldt
(Continued)

FOREIGN PATENT DOCUMENTS

EP   2851285 A    3/2015
EP   2913733 A1   9/2015
(Continued)

OTHER PUBLICATIONS

International Searching Authority, International Search Report and Written Opinion dated Feb. 21, 2019 re: International Application No. PCT/CA2018/051495.
(Continued)

*Primary Examiner* — Rodney A Bonnette
(74) *Attorney, Agent, or Firm* — Norton Rose Fulbright Canada LLP

(57) ABSTRACT

A system and a method for improving a stall margin of an aircraft during a climb phase of flight are disclosed. In one embodiment, the method comprises using data indicative of a phase of flight of the aircraft and data indicative of an angle-of-attack, and automatically commanding a deployment of leading edge slats movably attached to wings of the aircraft when the following conditions are true: the aircraft is in a climb phase of flight; and the angle-of-attack equals or exceeds a predefined deployment angle-of-attack threshold value.

26 Claims, 4 Drawing Sheets

(56) References Cited

U.S. PATENT DOCUMENTS

| | | | |
|---|---|---|---|
| 3,940,093 A | | 2/1976 | Cabriere |
| 8,356,776 B2 | | 1/2013 | Berens et al. |
| 9,180,962 B2 | * | 11/2015 | Moser ..................... B64C 9/06 |
| 9,415,861 B2 | * | 8/2016 | Berens .................... B64C 13/16 |
| 9,656,741 B2 | | 5/2017 | Moser et al. |
| 9,771,141 B2 | | 9/2017 | Moser et al. |
| 2005/0242243 A1 | | 11/2005 | Seve |
| 2015/0083855 A1 | | 3/2015 | Moser et al. |
| 2015/0105945 A1 | | 4/2015 | Moser et al. |

FOREIGN PATENT DOCUMENTS

| | | |
|---|---|---|
| RU | 2235042 C1 | 8/2004 |
| WO | 2009040102 A1 | 4/2009 |

OTHER PUBLICATIONS

English translation of Russian patent document No. RU2235042 dated Aug. 27, 2004, https://patents.google.com/patent/RU2235042C1/en?oq=RU2235042, accessed on May 29, 2020.

English translation of patent document No. WO2009040102 dated Apr. 2, 2009, https://patents.google.com/patent/WO2009040102A1/en?oq=WO2009040102, accessed on May 29, 2020.

* cited by examiner

SYSTEM AND METHOD FOR IMPROVING A STALL MARGIN OF AN AIRCRAFT

CROSS-REFERENCE TO RELATED APPLICATION(S)

This application is a national phase application under 35 U.S.C. 371 of International Patent Application No. PCT/CA2018/051495 filed on Nov. 26, 2018, which claims priority from U.S. Provisional Patent Application Ser. No. 62/592,695 filed on Nov. 30, 2017, the entire content of which is incorporated herein by reference.

TECHNICAL FIELD

The disclosure relates generally to aircraft, and more particularly to improving a stall margin of an aircraft.

BACKGROUND

The accumulation of ice on an aircraft wing can change the shape of the wing and alter the performance characteristics of the wing. For example, an ice build-up can be accompanied with increased drag, reduced lift, and a reduced angle-of-attack at which the wing enters a stall condition. For this reason, airplanes are often equipped with ice protection systems designed to prevent ice from accumulating on aircraft wings. Ice protection systems can either prevent the formation of ice on the surface(s) altogether or facilitate shedding of the ice before it can accumulate to a dangerous thickness.

The pilot workload during take-off can be relatively high and in the event where the pilot would either forget to activate the ice-protection system of the aircraft or not activate the ice protection system early enough, some ice could potentially form on the wings of the aircraft under appropriate atmospheric conditions and affect the performance characteristics of the wings.

SUMMARY

In one aspect, the disclosure describes a method for improving a stall margin of an aircraft during a climb phase of flight. The method comprises:

using data indicative of a phase of flight of the aircraft and data indicative of an angle-of-attack of the aircraft, automatically commanding a deployment of leading edge slats movably attached to wings of the aircraft when at least the following conditions are true:

the aircraft is in a climb phase of flight; and the angle-of-attack equals or exceeds a predefined deployment angle-of-attack threshold value.

The climb phase of flight may include an initial climb phase.

The method may comprise automatically commanding the deployment of the leading edge slats when the following condition is also true: the aircraft has exited an initial climb phase of flight.

The method may comprise automatically commanding the deployment of the leading edge slats when the following condition is also true: the aircraft is in an en route phase of flight.

The method may comprise automatically commanding the deployment of the leading edge slats when the following condition is also true: an altitude of the aircraft equals or exceeds about 400 ft (122 m).

The method may comprise automatically commanding the deployment of the leading edge slats when the following condition is also true: an or the altitude of the aircraft equals or is less than about 20,000 ft (6 km).

The method may comprise automatically commanding the deployment of the leading edge slats when the following condition is also true: the leading edge slats are in a fully retracted position.

The method may comprise automatically commanding the deployment of the leading edge slats when the following condition is also true: a slat control input device indicates a fully retracted position of the leading edge slats.

The method may comprise automatically commanding the deployment of the leading edge slats when the following condition is also true: a speed of the aircraft equals or is below a predetermined deployment speed threshold value.

The method may comprise, after the automatically commanded deployment of the leading edge slats, automatically commanding a retraction of the leading edge slats when the following condition is true: a speed of the aircraft exceeds the predetermined deployment speed threshold value.

The method may comprise, after automatically commanding deployment of the leading edge slats, automatically commanding a retraction of the leading edge slats when the following condition is true: the angle-of-attack equals or is below a predefined retraction angle-of-attack threshold value.

The automatically commanded retraction of the leading edge slats may be a full retraction of the leading edge slats.

The leading edge slats may include both inboard and outboard leading edge slats on a same wing.

The method may comprise automatically commanding the deployment of the leading edge slats during a degraded level of operation of an actuation system of the leading edge slats.

Embodiments can include combinations of the above features.

In another aspect, the disclosure describes a system for improving a stall margin of an aircraft during a climb phase of flight, the system comprising a controller for controlling an actuation of a plurality of leading edge slats movably attached to wings of the aircraft, the controller being configured to:

using data indicative of a phase of flight of the aircraft and data indicative of an angle-of-attack of the aircraft, automatically command a deployment of the leading edge slats when at least the following conditions are true:

the aircraft is in a climb phase of flight; and the angle-of-attack equals or exceeds a predefined deployment angle-of-attack threshold value.

The climb phase of flight may include an initial climb phase.

The controller may be configured to automatically command the deployment of the leading edge slats when the following condition is also true: the aircraft has exited an initial climb phase of flight.

The controller may be configured to automatically command the deployment of the leading edge slats when the following condition is also true: the aircraft is in an en route phase of flight.

The controller may be configured to automatically command the deployment of the leading edge slats when the following condition is also true: an altitude of the aircraft equals or exceeds about 400 ft (122 m).

The controller may be configured to automatically command the deployment of the leading edge slats when the following condition is also true: an or the altitude of the aircraft equals or is less than about 20,000 ft (6 km).

The controller may be configured to automatically command the deployment of the leading edge slats when the following condition is also true: the leading edge slats are in a fully retracted position.

The controller may be configured to automatically command the deployment of the leading edge slats when the following condition is also true: a slat control input device indicates a fully retracted position of the leading edge slats.

The controller may be configured to automatically command the deployment of the leading edge slats when the following condition is also true: a speed of the aircraft equals or is below a predetermined deployment speed threshold value.

The controller may be configured to, after the automatically commanded deployment of the leading edge slats, automatically command a retraction of the leading edge slats when the following condition is true: a speed of the aircraft exceeds the predetermined deployment speed threshold value.

The controller may be configured to, after the automatically commanded deployment of the leading edge slats, automatically command a retraction of the leading edge slats when the following condition is true: the angle-of-attack equals or is below a predefined retraction angle-of-attack threshold value.

The automatically commanded retraction of the leading edge slats may be a full retraction of the leading edge slats.

The controller may be configured to automatically command the deployment of both inboard and outboard leading edge slats on a same wing when the conditions are true.

The controller may be configured to automatically command the deployment of the leading edge slats during a degraded level of operation of an actuation system of the leading edge slats and also during a normal level of operation of the actuation system.

Embodiments can include combinations of the above features.

In a further aspect, the disclosure describes an aircraft comprising a system as disclosed herein.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to systems and methods for improving a stall margin of an aircraft during a climb phase of flight. In some embodiments, the systems and methods disclosed herein can serve to accommodate a delayed turn-on ice (DTO) situation where an ice protection system of the aircraft is not activated early enough to prevent at least some ice contamination of the (e.g., leading edges of the) wings of the aircraft. A DTO situation could, for example, potentially occur during a phase of flight (e.g., take-off) where the pilot workload is relatively high. The ice contamination during a DTO situation may not necessarily be excessive and the wings may not become visibly contaminated but such ice formation could nevertheless have some effect on the aerodynamic performance of the wings.

The accumulation of ice on aircraft wings can, for example, affect the lift-producing characteristics of some wings and hence reduce the stall margin (i.e., the margin between a level flight angle-of-attack and a stall angle-of-attack). As referenced herein, the angle-of-attack (sometimes called "alpha" or referenced using the Greek letter "α") is intended to encompass the angle between a reference line on a body, such as the chord line of an airfoil (e.g., aircraft wing) or the fuselage centerline (i.e., longitudinal axis) of the aircraft, and a flight path vector representing the relative motion between the body and the fluid (e.g., air) through which the body is moving. During climb, the angle-of-attack can be higher than during other phases of flight so it can be important to have an adequate stall margin during this phase of flight. The systems and methods disclosed herein can make use of automatic slat deployment to increase the lift produced by the wings during a condition of relatively high angle-of-attack during climb in order to improve the stall margin during this phase of flight.

Ultra-long range business jets can have wings that are designed for low drag and high speed performance and such wings can be sensitive to ice contamination. Designing such wings that are also stable in multiple phases of flight and conditions can be challenging. In some cases, such wings can exhibit unusual flight characteristics in some conditions with or without ice contamination. The use of automatic slat deployment to improve stall margin at such high angle-of-attack as disclosed herein could improve the operation of ultra-long range business jets in some situations. For example, it was observed that a wing designed for low drag and high speed performance could, in a relatively high angle-of-attack situation, exhibit flight (e.g., pitch) characteristics that may be undesirable to pilots. It was found that automatic slat deployment could, in some situations, eliminate or mitigate such undesirable flight characteristics for a wing designed for low drag and high speed performance.

Aspects of various embodiments are described through reference to the drawings.

Figure 1:
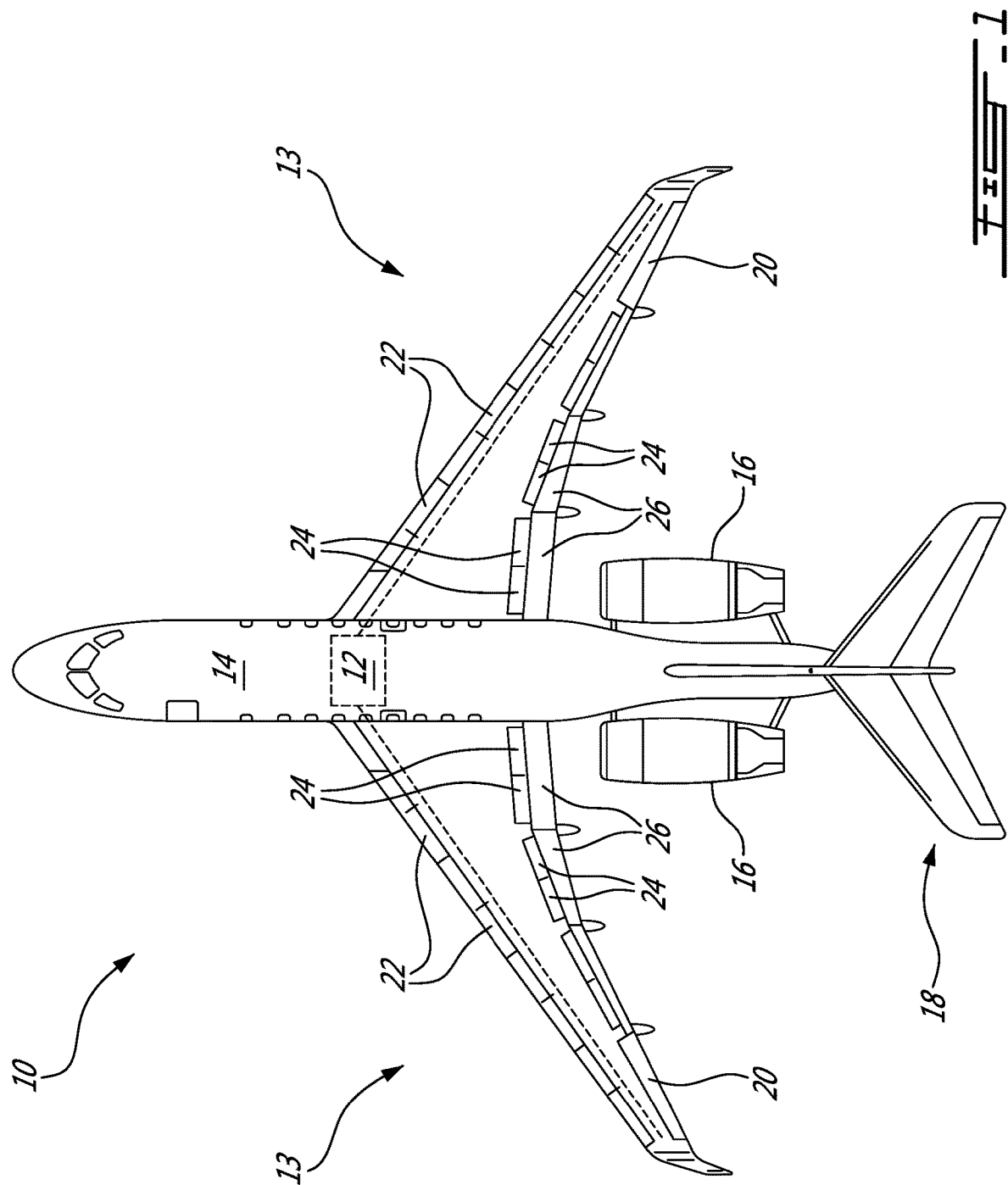
FIG. 1 is a top plan view of an exemplary aircraft comprising a system for improving a stall margin as described herein.

FIG. 1 is a top plan view of an exemplary aircraft 10 which may comprise auto-slat system 12 as described herein for improving a stall margin of aircraft 10. Aircraft 10 may be any type of aircraft such as corporate (e.g., business jet), private, commercial and passenger aircraft suitable for civil aviation. For example, aircraft 10 may be a narrow-body, twin-engine jet airliner or may be an ultra-long range business jet. Aircraft 10 may be a fixed-wing aircraft.

Aircraft 10 may comprise one or more wings 13, fuselage 14, one or more engines 16 and empennage 18. One or more of engines 16 may be mounted to fuselage 14. Alternatively, or in addition, one or more of engines 16 may be mounted to wings 13. Wings 13 may each include one or more flight control surfaces such as aileron(s) 20, leading edge slat(s) 22, spoiler(s) 24 and trailing edge flap(s) 26. Leading edge slats 22 and trailing edge flaps 26 may be considered "high-lift" flight control surfaces that may be deployed to increase the amount of lift generated by wings 13 during phase(s) of flight requiring increased lift. In some embodiments, wings 13 may be designed for low drag and high speed performance for use on an ultra-long range business jet for example.

FIG. 1 schematically shows auto-slat system 12 superimposed on aircraft 10 where auto-slat system 12 may be associated with leading edge slats 22 movably attached to a port side (i.e., left) wing 13 and also with leading edge slats 22 movably attached to a starboard side (i.e., right) wing 13. As illustrated in FIG. 1, auto-slat system 12 may be associated with all of leading edge slats 22 of each wing 13. For example, auto-slat system 12 may be associated with both inboard and outboard leading edge slats 22 of each wing 13 relative to fuselage 14. However, it is understood that in some embodiments, auto-slat system 12 could be associated with only one or some (e.g., inboard or outboard) slat(s) of each wing 13.

Figure 2:
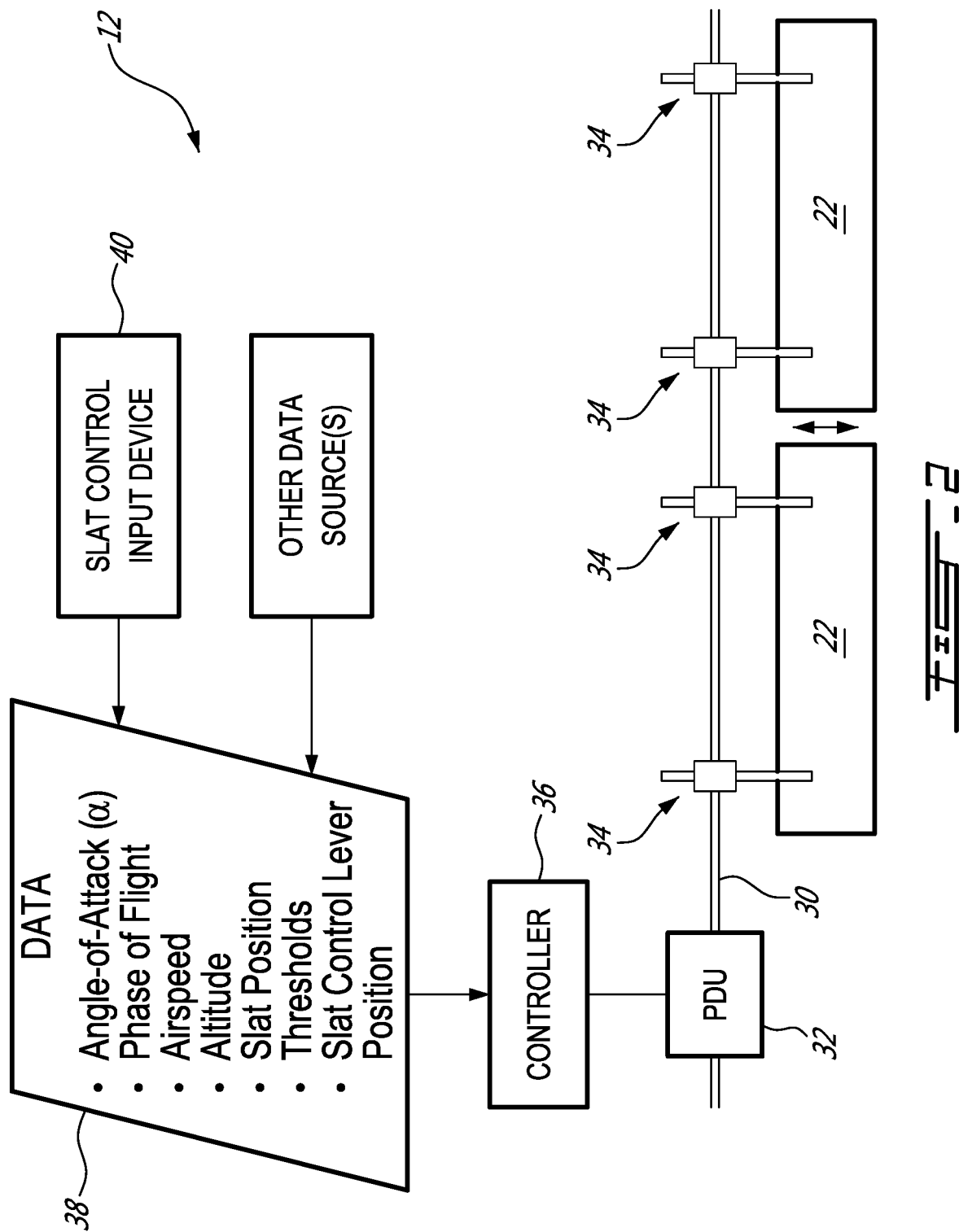
FIG. 2 is a schematic view of an exemplary system for improving the stall margin of the aircraft of FIG. 1.

FIG. 2 is a schematic representation of an exemplary auto-slat system 12 for improving a stall margin of aircraft 10. In some embodiments, auto-slat system 12 may be used specifically in a climb phase of flight of aircraft 10 following a take-off procedure associated with relatively high pilot workload for example. Auto-slat system 12 is illustrated in FIG. 2 together with only two leading edge slats 22 of one wing 13 for simplicity but it is understood that auto-slat system 12 can be associated with some or all leading edge slats 22 of both wings 13.

It is understood that aspects of the present disclosure are applicable to slat actuation systems of different configurations than those shown and described herein. In some embodiments, auto-slat system 12 may comprise driveline 30 for receiving a driving force (e.g., rotary force, torque) from power drive unit 32 (hereinafter "PDU 32"). Auto-slat system 12 may comprise a plurality of actuators 34 operatively coupled between driveline 30 and one or more leading edge slats 22 associated with wings 13 of aircraft 10. Actuators 34 may be configured to cause actuation of the one or more leading edge slats 22 in response to the driving force received at driveline 30. Driveline 30 may be a common driveline configured to drive all of actuators 34 for the purpose of deploying and retracting leading edge slats 22 (e.g., by way of different directions of rotation of one or more torque tubes of driveline 30).

Actuators 34 may each comprise a (e.g., ball) screw type of actuator or any other type of actuator suitable for actuating or transmitting an actuation force from driveline 30 to respective leading edge slats 22. Actuators 34 may be configured to convert a rotary input motion from driveline 30 to output motion suitable for actuating respective leading edge slats 22. PDU 32 may comprise a common source of motive power for driving driveline 30. In various embodiments, PDU 32 may comprise an electric motor or a hydraulic motor drivingly coupled to driveline 30 for example.

Auto-slat system 12 may comprise controller 36. Controller 36 may be operatively coupled to leading edge slats 22 via PDU 32 for commanding actuation of leading edge slats 22. Controller 36 may also be operatively coupled to other avionics component(s) or otherwise configured to receive commands from a pilot of aircraft 10 directly or indirectly, or receive commands from an auto-flight system of aircraft 10. Controller 36 may also be operatively coupled to receive data 38 directly or indirectly from one or more suitable data sources such as sensors or other avionics components. Controller 36 may be operatively coupled to slat control input device 40 actuatable by the pilot(s) to command actuation of leading edge slats 22. In some embodiments, slat control input device 40 may be a flap/slat control lever for commanding actuation of trailing edge flaps 26 and leading edge slats 22. Control input device 40 may serve to command different high-lift configuration settings.

Controller 36 may comprise one or more data processors and one or more computer-readable memories storing machine-readable instructions executable by the data processor(s) and configured to cause controller 36 to perform a series of steps so as to implement a computer-implemented process such that instructions, when executed by such data processor(s) or other programmable apparatus, can cause the functions/acts specified in the methods described herein to be executed. Memory(ies) can comprise any storage means (e.g. devices) suitable for retrievably storing machine-readable instructions executable by the data processor(s) of controller 36.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium(ia) having computer readable program code embodied thereon. The computer program product can, for example, be executed by controller 36 to cause the execution of one or more methods disclosed herein in entirety or in part. It is understood that, based on the present disclosure, one skilled in the relevant arts could readily write computer program code for implementing the methods disclosed herein.

Controller 36 may be operatively coupled to PDU 32 for commanding deployment and retraction of leading edge slats 22 in unison by controlling the operation of PDU 32 accordingly. In some embodiments, controller 36 may be dedicated to the actuation of leading edge slats 22 or may be configured to carry out other tasks as well. In some embodiments, controller 36 may comprise or be integrated with a dedicated high-lift system controller for example. In some embodiments, controller 36 may comprise or be integrated with a flight control computer (FCC) of a fly-by-wire system of aircraft 10 for example. Controller 36 may be configured to automatically command deployment and retraction of leading edge slats 22 based on data 38. In some embodiments, controller 36 may also be configured to control the actuation of leading edge slats 22 based on commands from a pilot or from an auto-flight system of aircraft 10.

Data 38 may comprise information indicative of a current state or operating condition of aircraft 10. Data 38 may comprise substantially real-time sensed parameters acquired via suitable sensors, computed/derived parameters and predetermined threshold values for example. In various embodiments, data 38 may comprise current angle-of-attack information, speed (e.g., airspeed), phase of flight, altitude, a position of leading edge slats 22 and predetermined threshold values (e.g., limits). Some or all of data 38 may be received at controller 36 in order to permit controller 36 to perform the tasks described herein. It is understood that some of data 38 could instead be computed/derived by controller 36 or could be stored in memory that is accessible by controller 32.

Using data indicative of a phase of flight of aircraft 10 and data indicative of angle-of-attack $\alpha$ of aircraft 10, controller 36 may automatically command a deployment of leading edge slats 22 when the following conditions are true: aircraft 10 is in a climb phase of flight; and angle-of-attack $\alpha$ equals or exceeds a predefined deployment angle-of-attack value.

The automatic deployment of leading edge slats 22 of wings 13 may be used specifically in a climb phase of flight of aircraft 10 following a take-off procedure associated with relatively high pilot workload. The take-off phase of flight may be divided into sub-phases of flight or segments and may terminate at the conclusion of an initial climb phase. The climb phase of flight referred herein may comprise an initial climb. The initial climb normally takes place after the aircraft leaves the ground (i.e., the aircraft is in air) and a climb pitch attitude has been established. The initial climb phase can normally be considered complete when the aircraft has reached a safe maneuvering altitude or an en route climb has been established. In some situations, the beginning of the initial climb phase may correspond to a moment when the high-lift surfaces are retracted and a thrust level of engines 16 is changed. In some situations, the beginning of the initial climb phase may correspond to an altitude of about 400 ft (122 m). The initial climb phase may terminate when aircraft 10 is in a clean configuration, which may correspond to an altitude of about 1500 ft (457 m). The climb phase of flight referred herein may also comprise an en route climb phase of flight. The en route climb phase may begin immediately following the initial climb and may terminate when aircraft 10 has reached an initial assigned cruise altitude.

In some embodiments, the automatic deployment of leading edge slats 22 may be transparent to the pilot(s) of aircraft 10. Alternatively, the automatic deployment of leading edge slats 22 may be accompanied by a communication informing the pilot(s) of aircraft 10 of the automatic deployment of leading edge slats 22. Such communication can include a text message or other type of visual indication provided on a flight deck of aircraft 10, and/or the communication can include an aural message. In order to avoid distracting the pilot(s) during periods of relatively high pilot workload, it is contemplated that the automatic deployment of leading edge slats 22 and the optional accompanying communication would occur only after an initial take-off procedure.

In some embodiments, the automatic deployment of leading edge slats 22 may be inhibited prior to the initial climb phase of flight. In some embodiments, the automatic deployment of leading edge slats 22 may be permitted only after aircraft 10 has entered the initial climb phase of flight. In some embodiments, the automatic deployment of leading edge slats 22 may be inhibited prior to the en route climb phase of flight. In some embodiments, the automatic deployment of leading edge slats 22 may be permitted only after aircraft 10 has exited the initial climb phase of flight. In some embodiments, the automatic deployment of leading edge slats 22 may be permitted only after aircraft 10 has entered an en route phase of flight.

Figure 3:
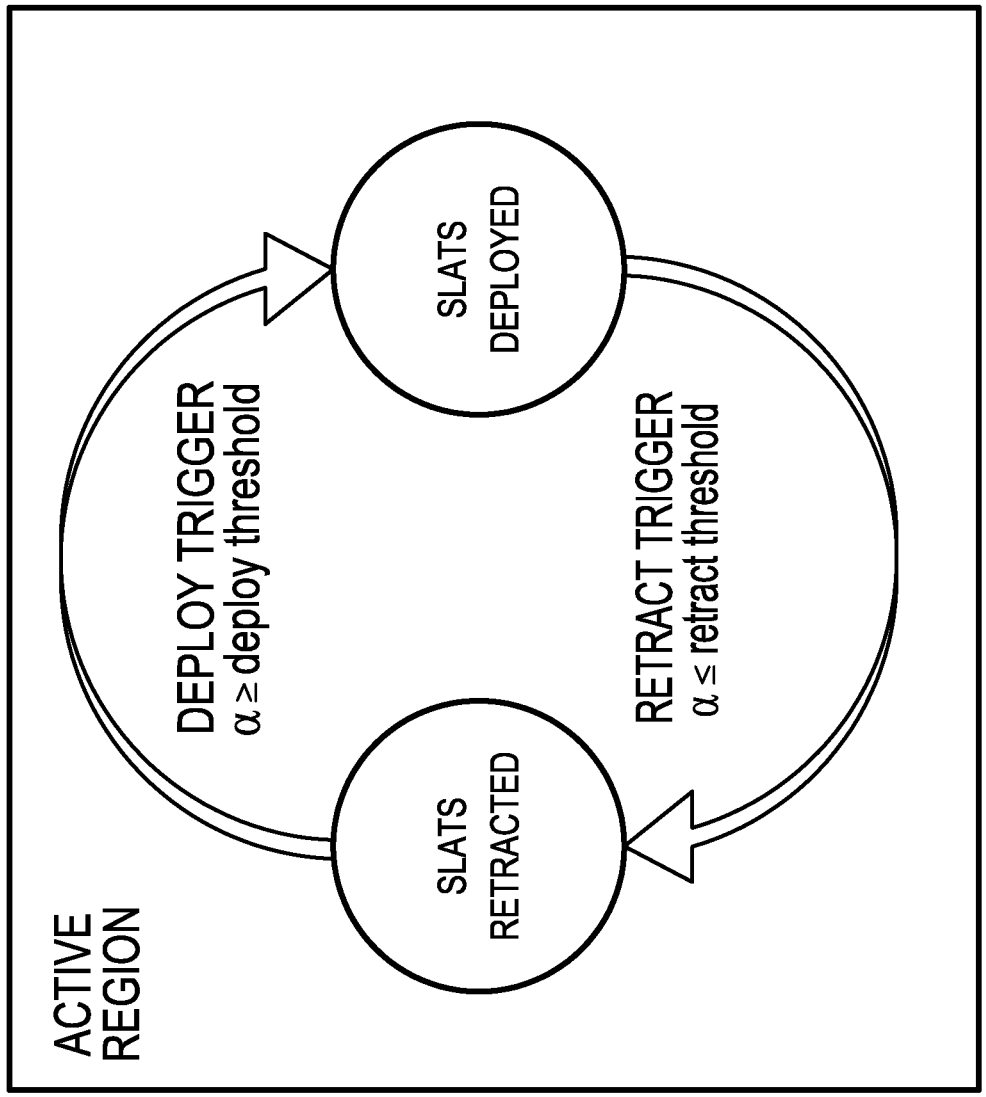
FIG. 3 is a state diagram for the system of FIG. 2.

FIG. 3 is a state diagram for auto-slat system 12 and illustrates retracted and deployed states of leading edge slats 22 and the applicable deploy and retract triggers that cause the automatic deployment or retraction of leading edge slats 22. The state diagram illustrates the operation of auto-slat system 12 when auto-slat system 12 is in its armed state (i.e., auto-slat active region) when one or more conditions are met based on one or more parameters from data 38. For example, as explained above, auto-slat system 12 may be armed or active only in a climb phase of flight in some embodiments. Additional conditions to be met for causing auto-slat system 12 to be armed may include some or all of the following:

a speed (e.g., airspeed) of aircraft 10 being less than or equal to a predetermined deployment speed threshold value (e.g., ≤230 kts);

the speed (e.g., airspeed) of aircraft 10 is within a predetermined range (e.g., between 210 kts and 230 kts);

slat control input device 40 indicating a fully retracted commanded position of leading edge slats 22 (e.g., slat control lever position 0);

leading edge slats 22 being in a fully retracted position;

the altitude of aircraft 10 being greater than or equal to a minimum altitude threshold value (e.g., ≥400 feet); and/or the altitude of aircraft 10 being less than or equal to a maximum altitude threshold value (e.g., ≤20,000 feet).

In some embodiments, the use of auto-slat system 12 may be used to accommodate or compensate for some potential ice contamination of wings 13 due to a DTO situation. Accordingly, auto-slat system 12 may be inhibited at higher altitudes where the risk of ice contamination is reduced (e.g., at altitudes above 20,000 feet). However, it is understood that auto-slat system 12 may be used to mitigate undesirable flight characteristics with or without ice contamination.

One or more deploy triggers may be required to trigger the automatic deployment of leading edge slats 22 after auto-slat system 12 has been armed. For example, the current angle-of-attack α being equal to or exceeding the predefined deployment angle-of-attack threshold value (e.g., 9 degrees) can be a deploy trigger.

Auto-slat system 12 may also be configured to, after the automatically commanded deployment of leading edge slats 22, automatically command a retraction of leading edge slats 22 when one or more conditions are met. For example, once leading edge slats 22 are deployed, leading edge slats 22 may be automatically retracted once angle-of-attack α has been reduced and/or a speed of aircraft 10 has increased. For example, controller 36 may be configured to automatically command the retraction of leading edge slats 22 when the following condition is true: the angle-of-attack α equals or is below a predefined retraction angle-of-attack threshold value. Alternatively or in addition, controller 36 may be configured to automatically command the retraction of leading edge slats 22 when auto-slat system 12 exits its armed state (i.e., auto-slat active region). For example, controller 36 may be configured to automatically command the retraction of leading edge slats 22 when the following condition is true: the speed of the aircraft exceeds the predetermined deployment speed threshold value (e.g., >230 kts). The automatically commanded retraction of leading edge slats 22 may be a full retraction of leading edge slats 22 (i.e., back to a 0 degree position corresponding to the commanded position indicated by slat control input device 40). In some embodiments, the retraction angle-of-attack threshold value (e.g., 8 degrees) may be lower than the deployment angle-of-attack threshold value (e.g., 9 degrees).

In some embodiments, auto-slat system 12 may be configured to operate during a normal level of operation of the actuation system of leading edge slats 22 and also during a degraded level of operation of an actuation system of the leading edge slats 22. In other words, auto-slat system 12 may be configured to operate when the actuation system is fully functional and also when the actuation system has a reduced functionality due to a partial failure of part(s) (e.g., PDU 32, actuators 34, driveline 30) of the actuation system for example.

During the normal level of operation, leading edge slats 22 may be deployed to a predetermined deployed position at a predetermined deployment speed by auto-slat system 12 when the appropriate one or more conditions are met. However, during a degraded level of operation, the actuation system of leading edge slats 22 may not be capable of deploying leading edge slats 22 to the same deployed position at the same deployment speed due to the air loads acting on leading edge slats 22 and to the reduced capacity of the actuation system. Accordingly, it may be acceptable under a degraded level of operation to deploy leading edge slats 22 to a lower deployed position and at a lower deployment speed. In some embodiments, a deployed position (e.g., 5 degrees) of leading edge slats 22 under a degraded level of operation may be about half of a deployed position (e.g., 10 degrees) of leading edge slats 22 under a normal level of operation of the actuation system. Similarly, a deployment speed of leading edge slats 22 under a degraded level of operation may be about half of a deployment speed of leading edge slats 22 under a normal level of operation of the actuation system.

Figure 4:
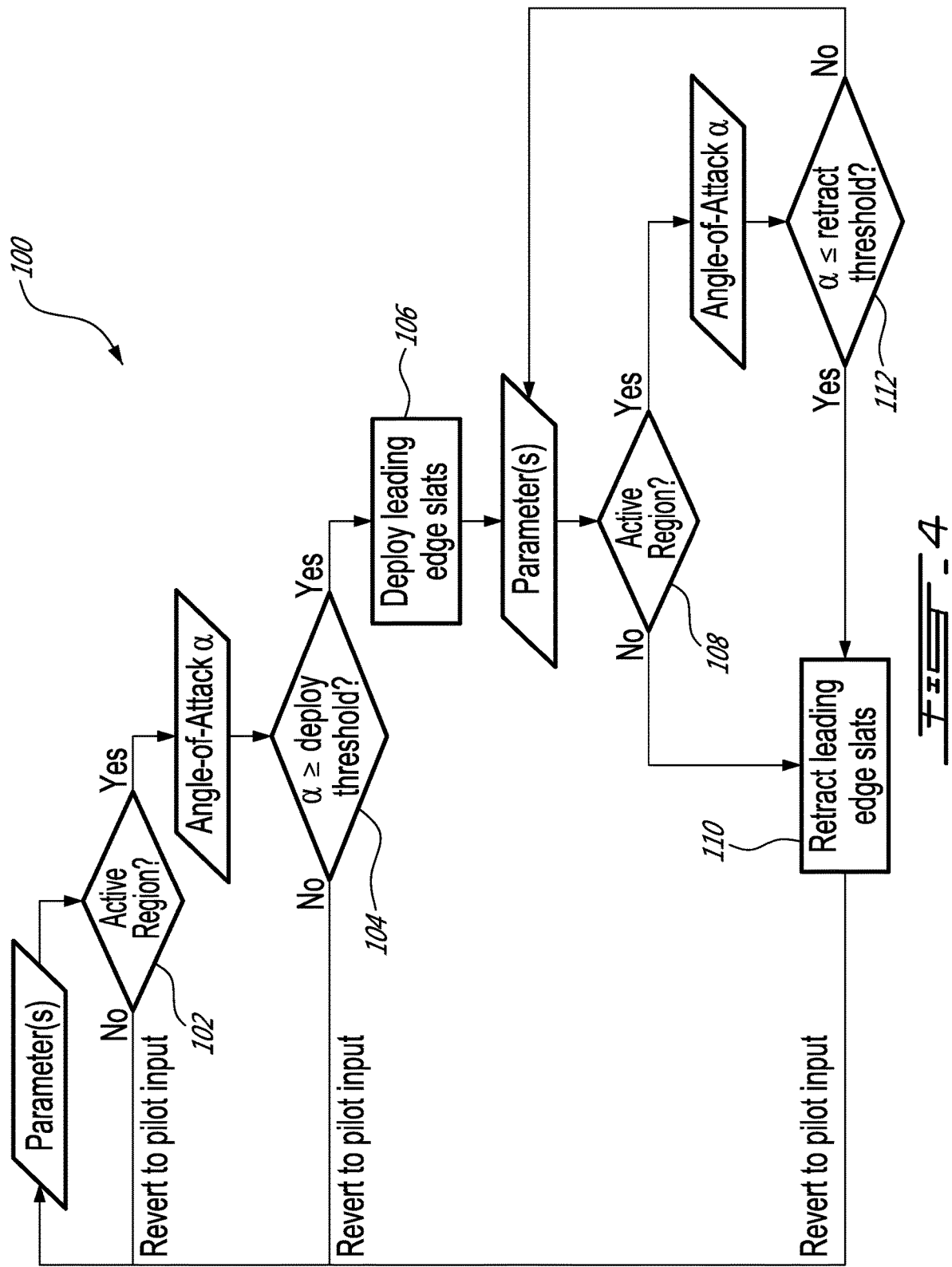
FIG. 4 is a flow diagram illustrating a method for improving the stall margin of the aircraft of FIG. 1.

FIG. 4 is flow diagram illustrating method 100 for improving stall performance of aircraft 10 during a climb phase of flight. Method 100 can be performed using auto-slat system 12 as described above or using another suitable system. Method 100 may represent a control law (or part thereof) associated with auto-slat system 12. Aspects and functions of auto-slat system 12 disclosed herein can also be applicable to method 100. Method 100 may comprise:

using data indicative of a phase of flight of aircraft 10 and data indicative of angle-of-attack α, automatically commanding a deployment (see block 106) of leading edge slats 22 movably attached to wings 13 of aircraft 10 when at least the following conditions are true:

auto-slat system 12 is in an auto-slat active region (e.g., aircraft 10 is in a climb phase of flight) (see block 102); and angle-of-attack α equals or exceeds a predefined deployment angle-of-attack threshold value (see block 104).

At block 102, if the relevant parameter(s) are not indicative of the active region of auto-slat system 12 being applicable, the control of leading edge slats 22 may revert to being based on pilot input (e.g., via slat control input device 40).

At block 104, if the angle-of-attack α does not equals or exceed the predefined deployment angle-of-attack threshold value, the control of leading edge slats 22 may revert to being based on pilot input (e.g., via slat control input device 40).

As explained above, the climb phase of flight may include an initial climb phase of flight and/or an en route climb phase of flight.

Method 100 may comprise automatically commanding the deployment (see block 106) of leading edge slats 22 when one or more of the following additional conditions in any combination are also true:

aircraft 10 has exited an initial climb phase of flight;
aircraft 10 is in an en route phase of flight;
the altitude of aircraft 10 equals or exceeds about 400 ft (122 m);
the altitude of aircraft 10 equals or is less than about 20,000 ft (6 km);
leading edge slats 22 are in a fully retracted position;
slat control input device 40 indicates a fully retracted position of leading edge slats 22;
the speed of aircraft 10 is within a predetermined range; and/or
the speed of aircraft 10 equals or is below a predetermined deployment speed threshold value.

At block 108, if the relevant parameter(s) are not indicative of the active region of auto-slat system 12 being applicable, leading edge slats 22 may be retracted and the control of leading edge slats 22 may revert to being based on pilot input (e.g., via slat control input device 40).

After automatically commanding deployment of leading edge slats 22, method 100 may comprise automatically commanding a retraction (see block 110) of leading edge slats 22 when the following condition is true: angle-of-attack α equals or is below a predefined retraction angle-of-attack threshold value (see block 112).

Alternatively or in addition, after automatically commanding deployment of leading edge slats 22, method 100 may comprise automatically commanding a retraction (see block 110) of leading edge slats 22 when auto-slat system 12 is no longer in its auto-slat active region (see block 108). For example, method 100 may comprise automatically commanding the retraction of leading edge slats 22 when the following condition is true: the speed of the aircraft exceeds the predetermined deployment speed threshold value (e.g., >230 kts).

The automatically commanded retraction of leading edge slats 22 may be a full retraction of leading edge slats 22. Leading edge slats 22 that are automatically deployed and/or retracted may include both inboard and outboard leading edge slats 22 on a same wing 13.

As explained above, method 100 may be performed during a degraded level of operation of the actuation system of leading edge slats 22, or, during a normal level of operation of the actuation system of leading edge slats 22.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for improving a stall margin of an aircraft during a climb phase of flight, the method comprising:
using data indicative of a phase of flight of the aircraft and data indicative of an angle-of-attack of the aircraft, automatically commanding a deployment of leading edge slats movably attached to wings of the aircraft when all of the following conditions are true:
the aircraft is in a climb phase of flight following a take-off procedure;
the angle-of-attack equals or exceeds a predefined deployment angle-of-attack threshold value when the aircraft is in the climb phase of flight; and
the leading edge slats are in a fully retracted position.

2. The method as defined in claim 1, wherein the climb phase of flight includes an initial climb phase.

3. The method as defined in claim 1, comprising automatically commanding the deployment of the leading edge slats when the following condition is also true: the aircraft has exited an initial climb phase of flight.

4. The method as defined in claim 1, comprising automatically commanding the deployment of the leading edge slats when the following condition is also true: the aircraft is in an en route phase of flight.

5. The method as defined in claim 1, comprising automatically commanding the deployment of the leading edge slats when the following condition is also true: an altitude of the aircraft equals or exceeds 400 ft (122 m).

6. The method as defined in claim 1, comprising automatically commanding the deployment of the leading slats when the following condition is also true: an altitude of the aircraft equals or is less than 20,000 ft (6 km).

7. The method as defined in claim 1, comprising automatically commanding the deployment of the leading edge slats when the following condition is also true: a slat control input device indicates a fully retracted position of the leading edge slats.

8. The method as defined in claim 1, comprising automatically commanding the deployment of the leading edge slats when the following condition is also true: a speed of the aircraft equals or is below a predetermined deployment speed threshold value.

9. The method as defined in claim 8, comprising, after the automatically commanded deployment of the leading edge slats, automatically commanding a retraction of the leading edge slats when the following condition is true: a speed of the aircraft exceeds the predetermined deployment speed threshold value.

10. The method as defined in claim 9, wherein the automatically commanded retraction of the leading edge slats is a full retraction of the leading edge slats.

11. The method as defined in claim 1, comprising, after automatically commanding deployment of the leading edge slats, automatically commanding a retraction of the leading edge slats when the following condition is true: the angle-of-attack equals or is below a predefined retraction angle-of-attack threshold value.

12. The method as defined in claim 1, wherein the leading edge slats include both inboard and outboard leading edge slats on a same wing.

13. The method as defined in claim 1, comprising automatically commanding the deployment of the leading edge slats during a degraded level of operation of an actuation system of the leading edge slats.

14. A system for improving a stall margin of an aircraft during a climb phase of flight, the system comprising a controller for controlling an actuation of a plurality of leading edge slats movably attached to wings of the aircraft, the controller being configured to:
using data indicative of a phase of flight of the aircraft and data indicative of an angle-of-attack of the aircraft, automatically command a deployment of the leading edge slats when all of the following conditions are true:
the aircraft is in a climb phase of flight following a take-off procedure;
the angle-of-attack equals or exceeds a predefined deployment angle-of-attack threshold value when the aircraft is in the climb phase of flight; and
the leading edge slats are in a fully retracted position.

15. The system as defined in claim 14, wherein the climb phase of flight includes an initial climb phase.

16. The system as defined in claim 14, wherein the controller is configured to automatically command the deployment of the leading edge slats when the following condition is also true: the aircraft has exited an initial climb phase of flight.

17. The system as defined in claim 14, wherein the controller is configured to automatically command the deployment of the leading edge slats when the following condition is also true: the aircraft is in an en route phase of flight.

18. The system as defined in claim 14, wherein the controller is configured to automatically command the deployment of the leading edge slats when the following condition is also true: an altitude of the aircraft equals or exceeds 400 ft (122 m).

19. The system as defined in claim 14, wherein the controller is configured to automatically command the deployment of the leading edge slats when the following condition is also true: an altitude of the aircraft equals or is less than 20,000 ft (6 km).

20. The system as defined in claim 14, wherein the controller is configured to automatically command the deployment of the leading edge slats when the following condition is also true: a slat control input device indicates a fully retracted position of the leading edge slats.

21. The system as defined in claim 14, wherein the controller is configured to automatically command the deployment of the leading edge slats when the following condition is also true: a speed of the aircraft equals or is below a predetermined deployment speed threshold value.

22. The system as defined in claim 21, wherein the controller is configured to, after the automatically commanded deployment of the leading edge slats, automatically command a retraction of the leading edge slats when the following condition is true: a speed of the aircraft exceeds the predetermined deployment speed threshold value.

23. The system as defined in claim 22, wherein the automatically commanded retraction of the leading edge slats is a full retraction of the leading edge slats.

24. The system as defined in claim 14, wherein the controller is configured to, after the automatically commanded deployment of the leading edge slats, automatically command a retraction of the leading edge slats when the following condition is true: the angle-of-attack equals or is below a predefined retraction angle-of-attack threshold value.

25. The system as defined in claim 14, wherein the controller is configured to automatically command a deployment of both inboard and outboard leading edge slats on a same wing when the conditions are true.

26. An aircraft comprising the system as defined in claim 14.

* * * * *